United States Patent [19]

Kassai

[11] Patent Number: 4,645,229
[45] Date of Patent: Feb. 24, 1987

[54] MECHANISM FOR LOCKING OPENED STATE OF BABY CARRIAGE

[75] Inventor: Kenzou Kassai, Osaka, Japan

[73] Assignee: Aprica Kassai Kabushikikaisha, Osaka, Japan

[21] Appl. No.: 820,949

[22] Filed: Jan. 21, 1986

Related U.S. Application Data

[62] Division of Ser. No. 626,110, Jun. 28, 1984, Pat. No. 4,616,844.

[30] Foreign Application Priority Data

Jul. 15, 1983 [JP] Japan ............................ 58-110370
Nov. 4, 1983 [JP] Japan ............................ 58-207729

[51] Int. Cl.$^4$ ............................................. B62B 7/06
[52] U.S. Cl. ............................ 280/650; 280/47.38; 403/96
[58] Field of Search ............... 280/656, 642, 643, 644, 280/647, 650, 658, 655, 47.37 R, 47.38; 403/92, 93, 96

[56] References Cited

U.S. PATENT DOCUMENTS

| | | | |
|---|---|---|---|
| 4,317,581 | 3/1982 | Kassai | 280/644 |
| 4,515,389 | 5/1985 | Kassai | 280/642 |
| 4,529,219 | 7/1985 | Shamie | 280/642 |
| 4,542,916 | 9/1985 | Kassai | 280/642 |

Primary Examiner—John J. Love
Assistant Examiner—Eric D. Culbreth
Attorney, Agent, or Firm—W. G. Fasse; D. H. Kane, Jr.

[57] ABSTRACT

In both the opened and closed states of a baby carriage, the push rod-side engaging portion (35) of a lock operating member (29) engages either of the two engaging portions (20, 21) formed on a connecting rod (4), whereby each of the opened and closed states can be locked. For example, in the opened state, the push rod-side engaging portion (35) engages the opened state locking purpose connecting rod-side engaging portion (20) of the connecting rod (4), whereby the push rod (3) and connecting rod (4), which are now in their linear state, are maintained in this state, and since this engagement is forced by a spring (34), a reliable locked state can be obtained. Further, in the closed state, the push rod-side engaging portion (35) engages the closed state locking purpose connecting rod-side engaging portion (21) of the connecting rod (4), whereby the push rod (3) and connecting rod (4), which are now in their bent state, are maintained in this state, with the spring (34) ensuring that the locked state is reliable. When it is desired to cancel these locked states, this can be attained by sliding the lock operating member (29) upward.

4 Claims, 10 Drawing Figures

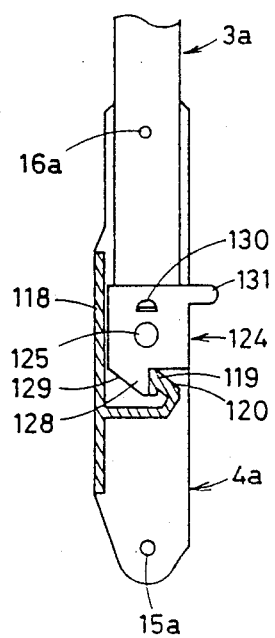
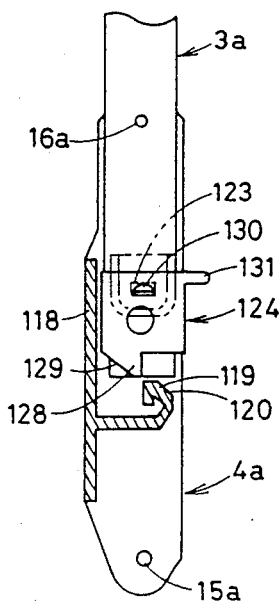
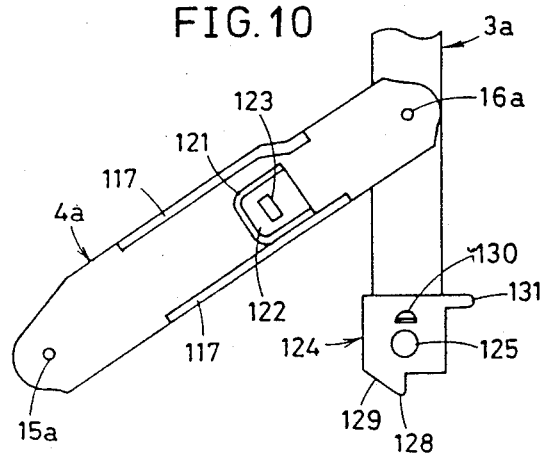

MECHANISM FOR LOCKING OPENED STATE OF BABY CARRIAGE

CROSS REFERENCE TO RELATED APPLICATION

The present application is a Divisional Application of my copending U.S. Ser. No.: 626,110, filed on June 28, 1984 now U.S. Pat. No. 4,616,844, issued Oct. 1, 1986.

BACKGROUND OF THE INVENTION

This invention relates to a mechanism for locking the opened state or both the opened and closed states of a foldable baby carriage.

A foldable baby carriage is brought into the opened or closed state depending on circumstances. For example, the foldable baby carriage is in the opened state when moved with a baby placed therein. On the other hand, when it is carried without a baby placed therein, it is brought into the closed state.

The securement of the opened state of the baby carriage is important to the stabilization of its travel with a baby placed therein and to the enhancement of safety. Further, accidental opening of the baby carriage in its closed state makes carrying of the baby carriage in its closed state troublesome.

Thus, a suitable locking mechanism is required to make reliable both the closed and opened states of such foldable baby carriage. Such locking mechanisms will be constructed according to the respective types of baby carriages, and a foldable baby carriage to which the locking mechanism of this invention is applied includes at least the following arrangement. It has a pair of front legs, a pair of rear legs, a pair of push rods, and a pair of connecting rods pivotally connecting, each at its opposite ends, the respective rear legs and push rods. When the push rods and the associated connecting rods are straightened and fixed, the opened or unfolded state of the baby carriage is locked, while when the push rods and the associated connecting rods are folded and fixed, the closed state of the baby carriage is locked.

When such foldable baby carriage is arranged so that its opened or unfolded and closed or folded states can be locked, it is preferable from the standpoint of operability that the locking automatically take place at the end of movement from closed to opened state and at the end of movement from opened to closed state. On the other hand, when the opened state is to be changed to the closed state and the closed state to the opened state, it is desirable from the standpoint of safety that the locked state can be canceled only after a positive human manipulation.

SUMMARY OF THE INVENTION

An object of this invention is to provide an opened state locking mechanism simple in construction and superior in operability and safety, for use with a foldable baby carriage of the described type.

Another object of this invention is to provide a mechanism for locking the opened and closed states of a foldable baby carriage of the described type, which is simple in construction and superior in operability and safety and which is capable of locking both the opened and closed states by using a single common member.

This invention, as described above, is applied to a foldable baby carriage having a pair of front legs, a pair of rear legs, a pair of push rods, and a pair of connecting rods turnably connecting, each at its opposite ends, the respective rear legs and push rods. Each connecting rod is turnably connected at a first pivot point to the associated rear leg and at a second pivot point to the associated push rod. The second pivot point for connecting the push rod to the connecting rod is positioned a predetermined distance above the lower end of the push rod. Therefore, when the push rod and the connecting rod are aligned in a state which corresponds to the opened state of the baby carriage, it follows that the push rod and the connecting rod overlap each other a predetermined distance. It is in this overlapping portion that the locking mechanism is formed. That is, the lower end of each push rod is provided with a lock operating member slidable in the direction of the length of the push rod. The lock operating member is constantly urged by a spring to slide toward the lower end of the push rod. The lower end of the lock operating member is formed with an engaging portion following an inclined guide portion. On the other hand, each connecting rod is formed with a hook portion following an inclined portion, said hook portion being adapted to engage said engaging portion when the lock operating member is in its lower end position. Further, in the slide movement of the lock operating member which is effected when cancelling the locking, more particularly, in the operation which is performed so that the lock operating member slides toward the upper end of the push rod against the force of the spring, the position of the lock operating member is temporarily retained, and for this purpose, the opposed surfaces of the connecting rod and lock operating member are formed with an engaging pawl and an engaging hole which are adapted to engage each other. When such engaging pawl and engaging hole engage each other, the lock operating member is fixed and prevented from sliding relative to the connecting rod and in this state the engagement of said engaging portion with said hook portion has been canceled.

According to the invention, in the opened state of the baby carriage, the engaging portion of each lock operating member engages the hook portion of the associated connecting rod to maintain the push rod and connecting rod in the straight or unfolded state, with the spring forcing them into this engagement; thus, a reliable locked open state can be obtained. Further, when it is desired to cancel such locked open state to bring the baby carriage into its closed state, the lock operating member is upwardly slid, whereupon the engaging pawl engages the engaging hole, with the result that the unlocked state is maintained; thus, there is no need for the operator to keep applying the force. Therefore, the operator is allowed to concentrate on the operation of bringing the baby carriage into its closed state. Further, when the baby carriage is to be changed from the closed to the opened state, the guide portion advantageously acts during such process to cause the engaging portion to automatically engage the hook portion, so that there is no need for a special operation for locking.

In a preferred embodiment of the invention, positioned on one end of each said connecting rod is a first pivot point for turnably connecting the associated rear leg. Positioned in substantially the middle of each connecting rod is a second pivot point for turnably connecting the associated push rod. The second pivot point is located a predetermined distance above the lower end of the push rod. As a result, when the push rod and the connecting rod are in the straight, unfolded state, they overlap each other said predetermined distance. Each push rod is provided, above the second pivot point, with a lock operating member slidable in the direction of the length of the push rod. Each lock operating member is constantly urged by a respective spring to slide toward the lower end of the associated push rod. The lower end of each lock operating member comprises a portion for engaging the respective connecting rod. Each connecting rod comprises a first open state latch member for engaging the respective engaging portion when the lock operating member is in its lower end position and in said aligned state. Further, each connecting rod also comprises a second closed state latch member for engaging said engaging portion of the operating when the lock member operating member is in its lower end position and when the push rod and connecting rod are in their folded or closed state. At least, either the engaging portion or the first and second latch members are provided with inclined surfaces adapted to lead them into an automatic engagement against the force of the spring when they approach each other during the opening or closing movement of the baby carriage. Further, the surface of each lock operating member opposed to the associated connecting rod is formed with temporary engaging means, e.g., an engaging pawl. On the other hand, the surface of each connecting member opposed to the associated lock operating member is formed with an opened state unlocking engaging means, such as a hole and a closed state unlocking engaging means, such as a hole. The hole for locking the open state is positioned relative to said opened state locking connecting rod-side engaging portion. The hole for locking the closed state is positioned relative to said closed state locking connecting rod-side engaging portion. When the locking operating member is slid toward the upper end of the push rod against the force of said spring, said engaging pawl engages the opened state unlocking hole or the closed state unlocking hole. Thus, with the engaging portion of the locking member disengaged from the opened state latch or from the closed state latch each lock operating member is temporarily fixed to prevent it from sliding relative to the associated connecting rod.

According to a preferred embodiment of this invention, in both the opened and closed states of the baby carriage, the engaging portion of the lock operating member engages one of the two latches on the connecting rod, so that both the opened and closed states can be locked. For example, in the opened state, the engaging portion of the locking member engages the respective latch of the connecting rod, and the push rod and connecting rod, which are now in the straight, unfolded state, are maintained in this state under the force of the spring, so that a reliable locked open state is obtained. Further, in the closed state, the engaging portion of the locking member engages the respective latch of the connecting rod, and the push rod and connecting rod, which are now in the folded state, are maintained in this folded state, whereby the spring ensures a reliably locked closed state.

When it is desired to cancel these locked states, this can be attained by upwardly sliding each lock operating member. If the baby carriage is in the opened state, this operation allows the engaging pawl of the lock operating member to engage the opened state unlocking hole to temporarily maintain the unlocked state, so that there is no need for the operator to keep applying the force against the force of the spring. On the other hand, when it is desired to unlock the closed state, the lock operating member is upwardly slid, whereupon the engaging pawl engages the closed state unlocking hole, thereby maintaining the state in which the closed state is unlocked. As a result, the operator is allowed to concentrate on changing the baby carriage from the opened to the closed state or from the closed to the opened state. Further, when the baby carriage is changed from the closed to the opened state and from the opened to the closed state, since in the course of these operations the inclined surfaces lead the push rod-side engaging portion and the connecting rod-side engaging portion into automatic engagement with each other, there is no special operation for locking.

These objects and other objects, features, aspects and advantages of the present invention will become more apparent from the following detailed description of the present invention when taken in conjunction with the accompanying drawings.

BRIEF DESCRIPTION OF THE DRAWINGS

FIG. 8 shows the locked, open state of the baby carriage;

FIG. 9 shows the unlocked, open state of the baby carriage; and

FIG. 10 shows an intermediate state between the opened and closed states of the baby carriage.

DESCRIPTION OF THE PREFERRED EMBODIMENTS

Figure 1:
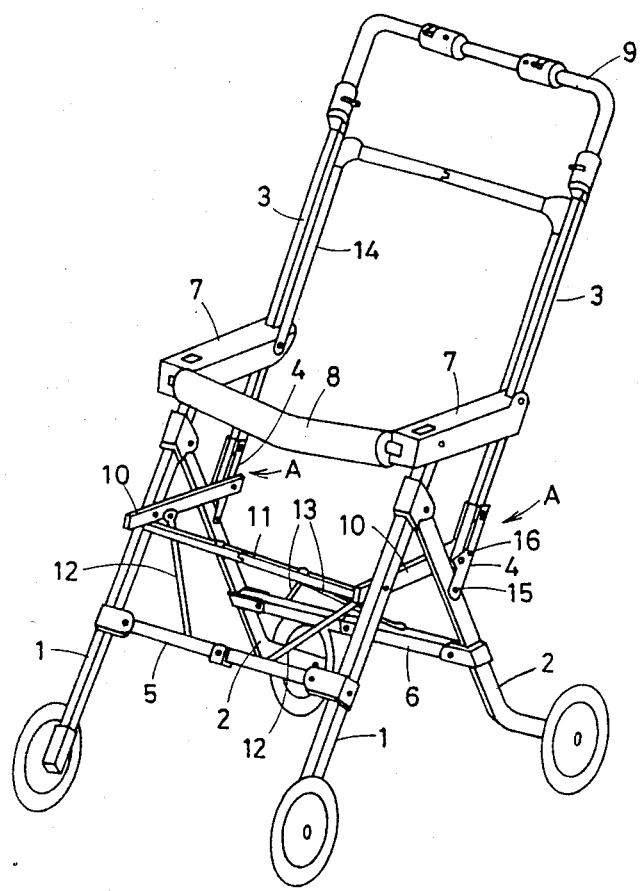
FIG. 1 is a perspective view showing the opened state of a baby carriage having an embodiment of this invention applied thereto.
Figure 2:
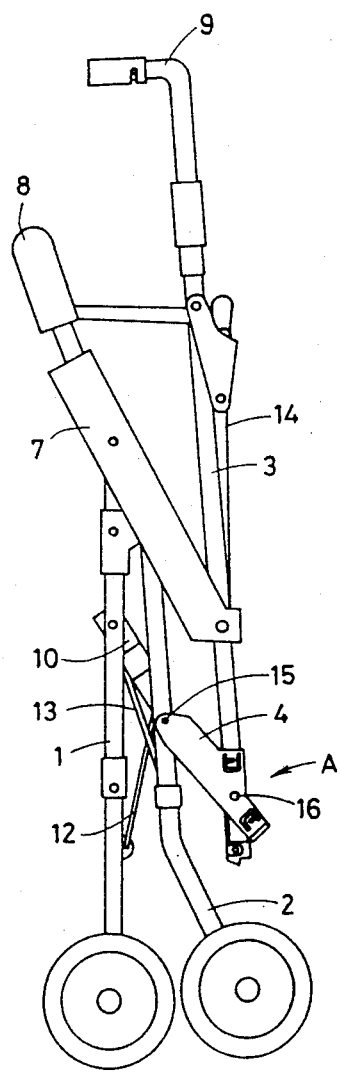
FIG. 2 is a right-hand side view showing the closed state of the baby carriage of FIG. 1.

A baby carriage opened and closed state locking mechanism according to an embodiment of this invention is attached to the baby carriage so as to lock both the opened state of FIG. 1 and the closed state of FIG. 2. The place of attachment is shown at A in FIGS. 1 and 2. Since an understanding of such locking mechanism necessitates a beforehand understanding of the arrangement of the baby carriage itself, the overall structure of the baby carriage will first be described.

Baby carriages of this type are disclosed in my U.S. Pat. No. 4,542,916, issued Sept. 24, 1985.

This baby carriage has a pair of front legs 1, a pair of rear legs 2, and a pair of connecting rods 4. The connecting rods 4 serve to connect, each at its opposite ends, the respective rear legs 2 and push rods 3.

As for another arrangement of the illustrated baby carriage, a foldable front leg connecting member 5 is connected at its opposite ends between the front legs 1 so that it is turnable relative to the front legs 1. Further, a foldable rear leg connecting member 6 is connected at its opposite ends between the rear legs 2 so that it is turnable relative to the rear legs 2. The rear legs 2 are turnably connected at their upper ends to the front legs 1. Handrails 7 are turnably connected at their front ends to the upper ends of the front legs 1 and at their rear ends to the push rods 3. A foldable torso quard 8 is turnably connected at its opposite ends between the handrails 7 so that it is turnably relative to the handrails 7. A foldable grip 9 is connected at its opposite ends between the upper ends of the push rods 3 so that it is turnable relative to the push rods 3. Longitudinal connecting members 10 are turnably connected at their front ends to the front legs 1 and at their rear ends to the connecting rods 4. A seat support member 11 which is foldable is connected at its opposite ends between the longitudinal connecting members 10 so that it is turnable relative to the longitudinal connecting members 10. Connecting rods 12 are operatively connected between the front leg connecting member 5 and the longitudinal connecting members 10 so that in the folding operation the movement of the longitudinal connecting members 10 is operatively associated with the folding of the front leg-connecting member 5. Further, connecting rods 13 are operatively connected between the rear leg connecting member 6 and the seat support member 11, whereby in the folding operation the folding of the rear leg connecting member 6 and the folding of the seat support member 11 are operatively associated with each other.

In addition, though not shown, the seat in the seat section of this baby carriage is formed between the longitudinal connecting members 10 and supported by the seat support member 11. The backrest of the seat section is held by a backrest holding member 14.

In such foldable baby carriage, when the opened state is changed to the closed state, the width dimension of the baby carriage is reduced, attended by the folding of the front leg connecting member 5, rear leg connecting member 6, torso guard 8, grip 9, and seat support member 11 while, as shown in FIG. 2, the front legs 1, rear legs 2, and push rods 3 are positioned substantially parallel to each other. In such folding movement, if attention is given to the movement of the portion A, it is seen that in the opened state, the push rods 3 and the respective connecting rods 4 are straight or in axial alignment relative to each other. And in the closed state, this alignment state is upset and the push rods 3 and the connecting rods 4 are mutually folded, for example, arranged in V-form.

In other words, when the opened state of the baby carriage is to be changed to the closed state, at least the aligned state of the push rod 3 and connecting rods 4 must be upset. Stated differently, so long as the aligned state of the push rods 3 and connection rod 4 is maintained, the baby carriage will not change to the closed state. Further, when the closed state is to be changed to the opened state, at least the disposition of the push rod 3 and connecting rod 4 which are now in the folded state must be upset. Therefore, in the closed state it follows that so far as the folded state of the push rod 3 and connecting rod 4 is maintained, the baby carriage will not change to the opened state.

Based on such principle, the embodiment of this invention provides a locking mechanism whereby in the opened state of the baby carriage the aligned state of the push rod 3 and connecting rod 4 is locked and in the closed state of the baby carriage the folded state of the push rod 3 and connecting rod 4 is locked.

The present embodiment is constructed to lock the baby carriage only in its opened state. Thus, the construction is correspondingly simpler than in the parent case.

In FIGS. 3 to 10 parts which are the same as or correspond to those shown in the parent case have the same reference numerals with the letter "a" suffixed to each numeral.

Figure 3:
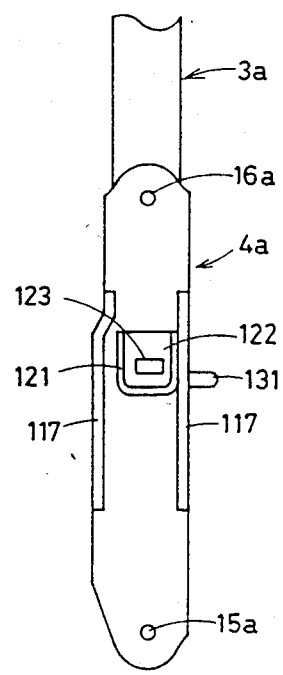
FIG. 3 shows a connecting portion between a push rod and a connecting rod, the view corresponding to the opened state of the baby carriage as shown in FIG. 1.

FIG. 3 is an external view showing the state of connection between a push rod 3a and a connecting rod 4a, the view corresponding to the opened state of the baby carriage. Positioned on the opposite ends of the connecting rod 4a are a first pivot pin 15a serving as a first pivot point for turnably connecting the rear leg 2, and a second pivot pin 16a serving as a second pivot point for turnably connecting the push rod 3a. The surface of the connecting rod 4a is formed with ribs 117 extending along the end edges to reinforce the connecting rod 4a.

Figure 4:
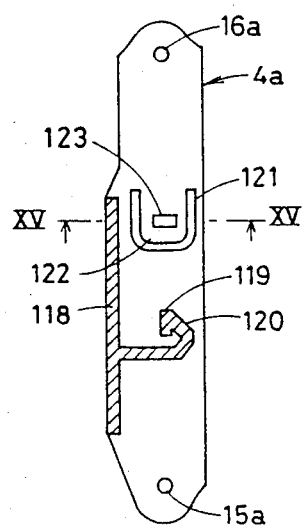
FIG. 4 is a longitudinal section of the connecting rod of FIG. 3.
Figure 5:
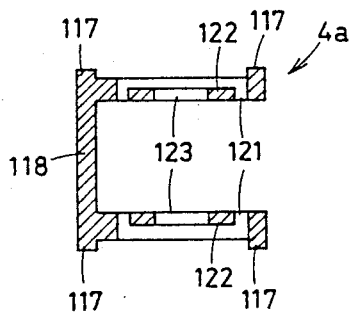
FIG. 5 is a section taken along the line V—V of FIG. 4.

In FIG. 4, the connecting rod 4a alone is shown in a longitudinal section, and in FIG. 5, a section taken along the line V—V of FIG. 4 is shown. As is clear from these figures, the connecting rod 4a has a U-shaped cross-section connected by end walls 118. Extending integrally from the end wall 118, a hook portion 119 is formed. The hook portion 119 extends from an inclined guide portion 120. The connecting rod 4a has tongues 122 each surrounded by an U-shaped cut 121, each said tongue 122 being thinner than the other portion, as shown in FIG. 5. Each tongue 122 is provided with an engaging hole 123.

Figure 6:
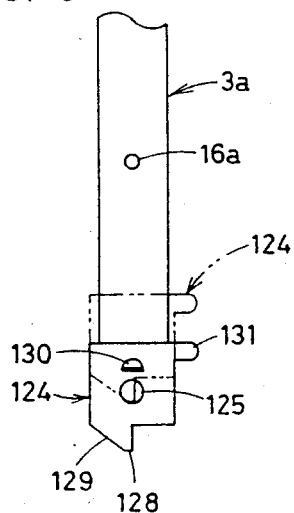
FIG. 6 shows the lower end portion of the push rod.
Figure 7:
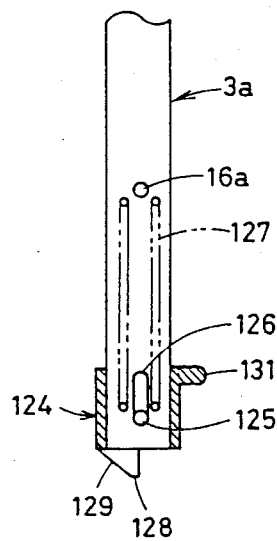
FIG. 7 shows the lower end portion of the push rod with a lock operating member shown in section.

In FIG. 6, the lower end portion of the push rod 3a alone is shown. The lower end portion of the push rod 3a is provided with a lock operating member 124 slidable in the direction of the length of the push rod 3a. In FIG. 7, the lock operating member 124 is shown in section to clarify the relation between the lock operating member 124 and the push rod 3a. Attached to the lock operating member 124 is a guide pin 125 extending through the push rod 3a, said guide pin 125 being received in an elongated guide hole 126 formed in the push rod 3a to extend in the direction of the length of the push rod 3a. Therefore, the lock operating member 124 is allowed to slide on the push rod 3a in the range in which the guide pin 125 can be moved in the elongated guide hole 126. The push rod 3a is fabricated, e.g., of a pipe, with a coiled compression spring 127 housed therein. The compression spring 127 abuts at its opposite ends against the second pivot pin 16a and guide pin 125, thereby constantly urging the lock operating member 124 toward the lower end of the push rod 3a. The lower end of the lock operating member 124 is formed with an engaging portion 128 paired, for engagement, with the hook portion 119 of the aforesaid connecting rod 4a and extending from an inclined guide portion 129. Further, the surfaces of the lock operating member opposed to the connecting rod 4a, that is, the forward and backward surfaces thereof in FIG. 6, are provided with engaging pawls 130 for engaging the aforesaid engaging holes 123 of the connecting rod 4a. In addition, the lock operating member 124 is formed with an operating portion 131 projecting therefrom so that even when the lower portion of the push rod 3a is received in the connecting rod 4a, the operating member projects beyond the connecting rod 4a to facilitate operation from the outside.

The operating method and movement of the locking mechanism obtained by the aforesaid push rod 3a, connecting rod 4a, and lock operating member 124 will now be described.

FIG. 8 shows the opened state of the baby carriage corresponding to FIG. 3, the connecting rod 4a being shown with its front wall removed. The lock operating member 124 is urged by the compression spring 127 (FIG. 7) to slide downward and the engaging portion 128 is engaged with the hook portion 119, preventing the push rod 3a and connecting rod 4a from turning in either direction relative to each other. That is, the push rod 3a and connecting rod 4a are locked in the linear state.

If the above locking is canceled, the baby carriage is allowed to change from opened to closed state. To effect such unlocking, the operator fingers the operating portion 131 to pull up the lock operating member 124 against the force of the spring 127 (FIG. 7), as shown in FIG. 9. When the engaging pawls 30 engage the engaging holes 123, the lock operating member 124 is temporarily maintained in this state in spite of the action of the spring 127. When the engaging pawls 30 engage the engaging holes 128, the engaging portion 128 of the lock operating member 124 is disengaged from the hook portion 119. Thus, the connecting rod 4a is now allowed to turn clockwise around the second pivot pin 16a relative to the push rod 3a. This turning allows the relative movement of the push rod 3a and connecting rod 4a in the course of the change from the opened to the closed state of the baby carriage as described above.

FIG. 10 shows an intermediate state with the connecting rod 4a turned clockwise around the second pivot pin 16a, the baby carriage changing to its closed state. During the change from the state of FIG. 9 to the state of FIG. 10, the engaging pawls 130 escape from the engaging holes 123. Upon completion of such escape, the lock operating member 124 is moved to the lower end of the push rod 3a by the action of the compression spring 27.

If FIG. 10 shows an intermediate state assumed by the baby carriage when changing from closed to opened state, then during change from the state of FIG. 10 to the state of FIG. 8 there is obtained a state in which the guide portion 129 of the lock operating member 124 contacts the guide portion 120 of the connecting rod 4a. In this contacted state, the two guide portions 129 and 120, while sliding along each other, cause the lock operating member 124 to slide on the push rod 3a against the force of the compression spring 127. When the contact between the guide portions 129 and 120 is about to end, the lock operating member 124 is downwardly moved by the action of the compression spring 127, establishing a state in which the engaging portion 128 engages the hook portion 119. That is, at the end of the course of change from the closed to the opened state of the baby carriage, the locked state is automatically established.

The embodiment described above may be modified as follows.

In the illustrated embodiment, the connecting rod 4a is of U-shaped cross-section adapted to receive the lock operating member 124 and the lower end of the push rod 3a, but the connecting rod may be a simple plate-like member.

Further, while the engaging holes 123 have been formed in the connecting rod 4a and the engaging pawls 130 have been formed on the lock operating member 124, reversely the engaging holes may be formed in the lock operating member and the engaging pawls on the connecting rod.

Further, in the illustrated embodiment, the engaging holes 123 are positioned in the tongues 122 of thin wall. While this arrangement allows smooth engagement of the engaging pawls 130 with the engaging holes 123, if such advantage is not desired, there is not need to pay such heed to the engaging holes.

Although the present invention has been described and illustrated in detail, it is clearly understood that the same is by way of illustration and example only and is not to be taken by way of limitation, the scope of the present invention being limited only by the terms of the appended claims.

What is claimed is:

1. In a mechanism for locking the opened state of a foldable baby carriage having a pair of front legs (1), a pair of rear legs (2), a pair of push rods (3a), and a pair of connecting rods (4a) for turnably connecting, each at its opposite ends, the respective rear legs (2) and push rods (3a), wherein when said push rods (3a) and said connecting rods (4a) associated therewith are brought into their unfolded state and locked for maintaining the opened state of the baby carriage, while the closed state of the baby carriage is obtained by moving said push rods (3a) and said connecting rods (4a) associated therewith into the folded state, the improvement comprising first and second pivot points at opposite ends of each of said connecting rods for turnably connecting each said rear leg (2) and each said push rod (3a) to each other, said second pivot point (16a) for connecting said push rod (3a) being positioned a predetermined distance above the lower end of the push rod (3a), whereby in said unfolded state, said push rod (3a) and said connecting rod (4a) overlap each other along said predetermined distance, a lock operating member (124) provided at the lower end of each said push rods (3a) in such a way that said lock operating member (124) is slidable in the direction of the push rod (3a), spring means (127) for constantly urging said lock operating member (124) urged by a spring (127) toward the lower end of the push rod (3a), said lock operating member (124) comprising at its lower end an inclined guide portion and an engaging portion (128) extending from said inclined guide portion (129), each of said connecting rods (4a) comprising a further guide portion and a hook portion (119) extending from said further guide portion (120) for engaging said engaging portion (128), and having means for engaging said connecting rod (4a) and the respective lock operating member (124), said engaging means including an engaging hole and an engaging pawl (130) for cooperation with said engaging hole (123) to prevent said lock operating member (124) from sliding relative to said connecting rod (4a) when said locking member (124) is moved on said push rod (3a) toward the upper end of said push rod (3a) against the force of said spring (127) to cancel an engagement with said hook portion (119) of said engaging portion (128).

2. The mechanism of claim 1, wherein said connecting rod (4a) has a U-shaped cross-section adapted to receive therein said lock operating member (124) and the lower end of said push rod (3a) when said unfolded state is established.

3. The mechanism of claim 1, wherein said engaging hole (123) is formed in said connecting rod (4), and wherein said engaging pawl (130) is formed on said lock operating member (124).

4. The mechanism of claim 3, wherein said connecting rod comprises a thin tongue, said engaging hole (123) being positioned in said thin tongue (122) formed in a portion of said connecting rod (4a).

* * * * *